: 3,706,028
Patented Dec. 12, 1972

3,706,028
METHOD FOR DETERMINING THE GRAM SIZE DISTRIBUTION OF FERROMAGNETIC MATERIAL
Matti N. T. Otala, Tinatie 16, Oulu 25, Finland
Filed Sept. 22, 1971, Ser. No. 182,815
Int. Cl. G01r *33/12*
U.S. Cl. 324—34 R                    1 Claim

ABSTRACT OF THE DISCLOSURE

The invention disclosed provides a method for measuring grain size distribution of ferromagnetic materials by correlating the amplitude size distribution of the steps of the magnetization curve with the grain size distribution.

---

The present invention relates to an electronic measuring method by which certain characteristics of ferromagnetic materials, for example of iron and iron containing compounds, can be measured and determined.

The characteristics of iron and its compounds, and their fitness for different purposes is depend to a very great extent on the grain size and grain shape. Hence, it is particularly, important to know the iron grain size and grain shape at the preparation of iron.

Optical measuring devices are generally used for measuring the grain size of iron. On the basis of samples made in an appropriate way, the number of grains per certain distance is calculated. This method is, however, not applicable to continuous control of the grain size of iron such as during rolling and for the heat treatment of iron since it is necessary to take a sample for optical measurement. This method is of limited value since in order to obtain a reliable result, the sample for optical measurement should be taken from the middle of the plate being processed and, secondly, the preparation has to be stopped for sampling.

The present invention provides a method that is applicable to continuous measuring of the distribution of grain size, distribution of grain shape and certain contents of iron containing materials without having the above-mentioned drawbacks noted for optical methods of analysis.

The method of this invention is based upon the insight that in most ferromagnetic materials, the relation between the grain size and the magnetized domains can be used for measurement techniques. A grain as used herein means the optically perceptible grain of a solid iron containing material. The limits of a grain consists of crystals, micro slag particles, different particles enclosures or other iregularities.

As known, the magnetization of ferromagnetic materials takes place by domains (so-called Weiss domains) which are magnetized to saturation flux in different directions such that in the neutral state, outside the body, the common resulting magnetic field of the domains is zero. While magnetizing such materials, these domains turn at different times in the direction of the external field by different magnetization mechanisms so that the so-called magnetization curve of the material is partly steplike (so-called Barkhausen affect).

When a material is magnetized by an external magnetic field from its state of rest to a full saturation flux, and the magnetic field is then removed, the Weiss domains are not necessarily formed as in the original state of rest. Therefore, an individual domain cannot, as such, be used to measure the size of the domain. By this invention, however, the statistical behaviour of many domains is considered by making use of the steps appearing in the magnetization curve. It has been found that the present method is useful where the size distribution of the domains remains unchanged provided that the magnetic characteristics of the materials do not permanently change, and that this distribution has a close relation to the grain size distribution of most ferromagnetic materials.

On the basis of this invention, the characteristics of a ferromagnetic material can be determined by making use of the amplitude distribution of the steps of the magnetization curve, appearing upon magnetizing the material.

The invention is described in detail as follows with reference to the figures in the attached drawings wherein.

Figure 1:
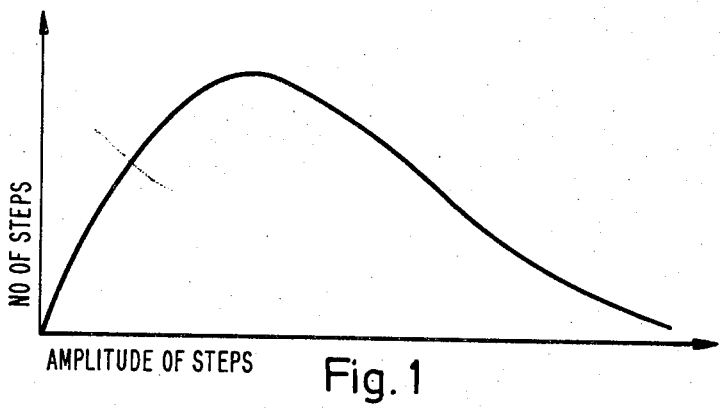
FIG. 1 shows a characteristic amplitude distribution of the steps of the magnetization curve appearing when a ferromagnetic material is magnetized.

In the curve shown by FIG. 1, the size of the steps of the magnetization curve increases in the direction of the horizontal axis W and their relative number in the direction of the vertical axis L. The peak of the amplitude distribution curve thus falls on the horizontal axis W where the corresponding Weiss domains are in majority in the material.

Figure 2:
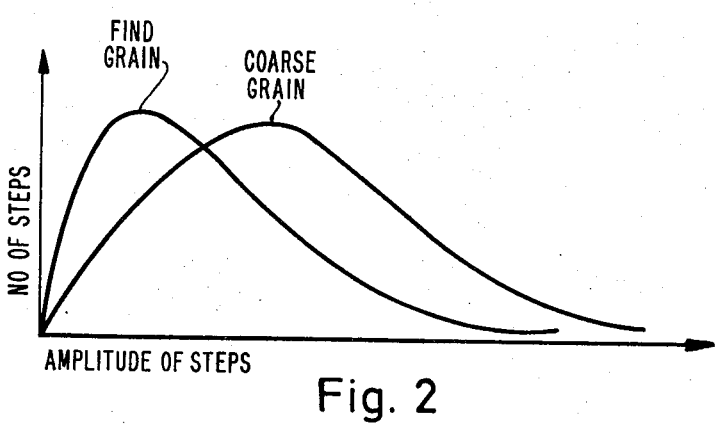
FIG. 2 shows the normalized amplitude distribution of the steps of the magnetization curve of fine grained and coarse grained material for a certain iron quality.

When the size of the Weiss domains decreases, the peak of the curve moves to the left towards the vertical axis, noting FIG. 2. The quality of the material to be prepared can then be controlled e.g. by illustrating the ferromagnetic amplitude distribution curve on an oscilloscope on which a model curve for the material quality has been drawn. The material to be prepared can then be processed such as to heat treatment until the measured distribution curve joins the model curve.

Figure 3:
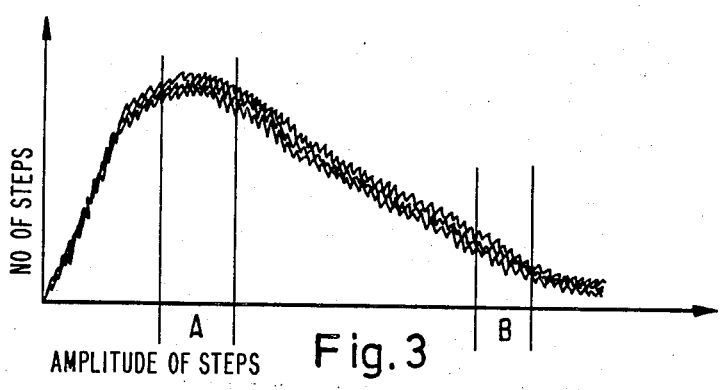
FIG. 3 shows the real amplitude distribution curve appearing on the screen of projection of an oscilloscope.

The real distribution curve visible on an oscilloscope is shown in FIG. 3. The fact that the curves obtained in different measurements do not coincide completely is due to the above-mentioned fact that the Weiss domains are not necessarily formed similarly after removing the magnetizing field as formed in the original state of rest. The turning of the individual domains cannot be used as a measure of the size of the grains. On the other hand, the amplitude distribution of the steps of the magnetization curve remains unchanged in shape in different measurements, provided that the magnetic characteristics of the material do not change permanently.

Figure 4:
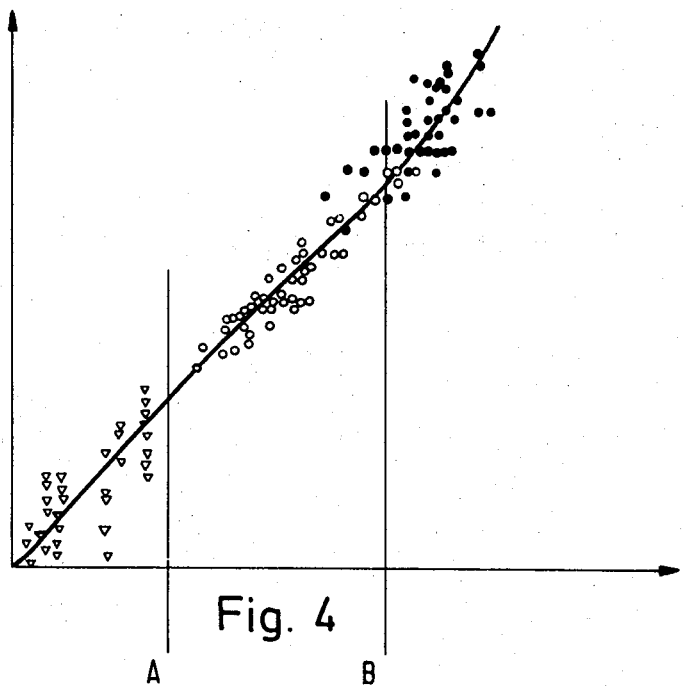
FIG. 4 shows, as an example, relation between the grain size of iron and the size of Weiss domains for certain iron compounds.

It is also possible to use the number of total pulses appearing in a certain size area of the steps such as for example, in FIG. 3, areas A and B. At that time a correction coefficient caused by different thicknesses of the material may be used. FIG. 4 shows the correlation between the grain size and the size of the Weiss domains. In this hypothetical case presented for purposes of illustration, at the medium grain sizes (range A–B) the size of the domains corresponds rather closely to the grain size.

The amplitude distribution of the steps of the magnetization curve for the material to be analyzed is thus in ferromagnetic materials closely related to the optically perceptible grain size of the material. The difference consists of the spatial omnidirectional distribution of the basic magnetization directions of the domains and the variation of the number of domains contained in exceptionally big or small grains. In inspection and process control during prepaartion of ferromagnetic materials, these phenomena are not harmful, since the object is not to determine the absolute size of the grains, but only to maintain the amplitude distribution curve similar in shape with the distribution curve measured from a laboratory sample.

By measuring the distribution of grain size in different directions and by comparing the measuring results, the grain shape distribution of the material can thus be determined. In case certain characteristics of the material are kept constant, it is possible, by this method, to measure, for example, contents of micro slag and/or reduced carbon in a ferromagnetic material.

An important substantial benefit of this method is that the analysis is performed on the total volume of the magnetized material whereas the common optical methods analyze the grain sizes only on a certain small surface. This is important in the analysis of processed ferromagnetic materials such as rolled steel sheets and the like. Moreover, the present method for analysis is performed in a direction of a magnetizing field which can be chosen arbitrarily, so as to facilitate, for example, measurement of grain size in the direction of the sheet surface.

The present method for measurement can be accomplished with for inc. autocorrelation function measurement of the step amplitudes, or the amplitude distribution of the steps.

Figure 5:
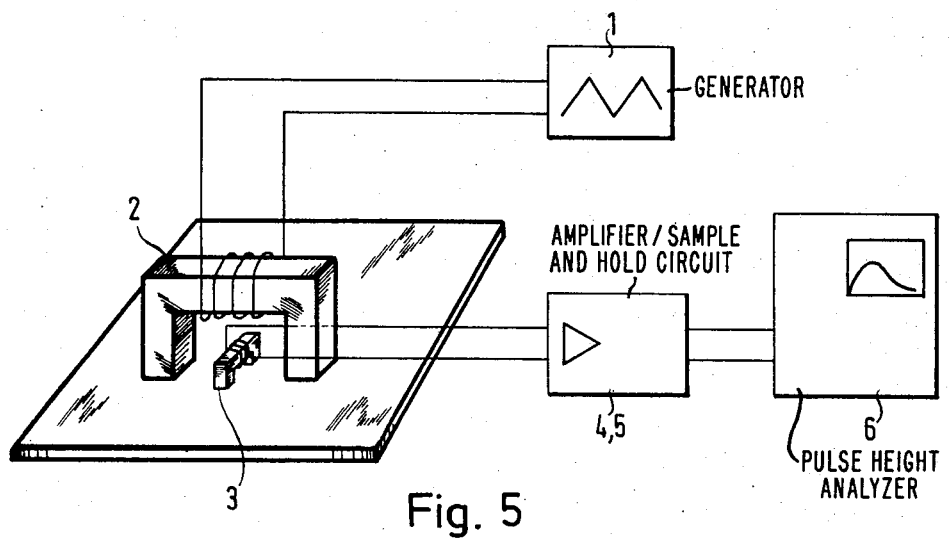
FIG. 5 shows, schematically, a device for carrying out the present method for measurement.

FIG. 5 illustrates a possible means for practicing the method of this invention using the analyzing equipment. The magnetizing generator 1 produces a magnetizing signal, which may, for example, consist of a triangle wave appropriately modified. The sample is magnetized by means of a coil 2 and in a particular receiving coil 3, a pulse-shaped voltage is generated by the steps. The voltage is amplified in an amplifier 4 and a series of readings are taken thereof on a sampling circuit 5. The amplitude distribution of these readings which are analyzed by a pulse height analyzer 6. The result can be shown, for example, as a distribution curve by means of an oscilloscope or demonstrated by a recorder or Teletype machine, if desired.

What is claimed is:

1. A method for the analyzing grain properties of a ferromagnetic material by utilizing the fact that the grain size distribution is closely related to the size distribution of the ferromagnetic domains, said method comprising magnetizing a ferromagnetic material, reading the amplitude distribution of steps of the magnetization curve derived during magnetizing, said amplitude distribution being a function of the size distribution of the ferromagnetic domains, and determining the grain size distribution of the ferromagnetic material by correlating the grain size distribution and the amplitude distribution of the steps of the magnetization curve.

References Cited

UNITED STATES PATENTS 3,427,872  2/1969  Leep et al. _____ 324—34 R

ROBERT J. CORCORAN, Primary Examiner